(12) United States Patent
Ishikawa et al.

(10) Patent No.: US 10,756,629 B2
(45) Date of Patent: Aug. 25, 2020

(54) POWER CONVERSION DEVICE

(71) Applicant: Mitsubishi Electric Corporation, Chiyoda-ku (JP)

(72) Inventors: Shuta Ishikawa, Chiyoda-ku (JP); Akihiko Iwata, Chiyoda-ku (JP); Tatsuki Matsunaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/472,052

(22) PCT Filed: Nov. 21, 2017

(86) PCT No.: PCT/JP2017/041743
§ 371 (c)(1),
(2) Date: Jun. 20, 2019

(87) PCT Pub. No.: WO2018/146902
PCT Pub. Date: Aug. 16, 2018

(65) Prior Publication Data
US 2020/0099300 A1 Mar. 26, 2020

(30) Foreign Application Priority Data

Feb. 10, 2017 (JP) .................................. 2017-023169

(51) Int. Cl.
*H02M 3/158* (2006.01)
*H02P 3/18* (2006.01)
*H02P 27/08* (2006.01)

(52) U.S. Cl.
CPC ............ *H02M 3/1582* (2013.01); *H02P 3/18* (2013.01); *H02P 27/08* (2013.01)

(58) Field of Classification Search
CPC .............. H02P 2201/09; H02P 2201/11; H02P 2201/07; H02P 1/00; H02P 1/04;
(Continued)

(56) References Cited

U.S. PATENT DOCUMENTS

| 10,171,022 B2* | 1/2019 | Kim ........................ F24F 13/14 |
| 2010/0141188 A1 | 6/2010 | Kakebayashi et al. |
| 2018/0034403 A1* | 2/2018 | Kim ........................ H02P 23/26 |

FOREIGN PATENT DOCUMENTS

| JP | 11-332286 A | 11/1999 |
| JP | 2004-357442 A | 12/2004 |

(Continued)

OTHER PUBLICATIONS

International Search Report dated Jan. 30, 2018 in PCT/JP2017/041743 filed Nov. 21, 2017.
(Continued)

*Primary Examiner* — Antony M Paul
(74) *Attorney, Agent, or Firm* — Xsensus LLP

(57) ABSTRACT

A converter supplies an output voltage, generated by stepping down or up an input voltage from a DC power supply, to an inverter for driving an AC motor. In the converter in a boost mode, a buck circuit is stopped, a boost circuit is operated, and a first bypass switch is turned on to form a path from the DC power supply to the boost circuit. In a buck mode, the boost circuit (30) is stopped, the buck circuit is operated, and a second bypass switch is turned on to form a path from the buck circuit to the inverter.

20 Claims, 9 Drawing Sheets

(58) Field of Classification Search
CPC ...... H02P 1/24; H02P 1/26; H02P 1/42; H02P 1/46; H02P 3/00; H02P 3/18; H02P 21/00; H02P 21/0035; H02P 6/00; H02P 6/14; H02P 7/00; H02P 7/29; H02P 23/00; H02P 25/00; H02P 27/00; H02P 27/04; H02P 27/06; H02P 27/08; H02P 29/00; H02M 1/42; H02M 1/4225; H02M 1/4233; H02M 3/00; H02M 3/1582; H02M 7/00; H02M 7/42; G05F 1/24
USPC .............. 323/259, 244; 318/400.01, 400.02, 318/400.14, 400.15, 700, 701, 721, 779, 318/799, 800, 801, 430, 432, 437
See application file for complete search history.

(56) References Cited

FOREIGN PATENT DOCUMENTS

| | | | |
|---|---|---|---|
| JP | 2005-45943 A | | 2/2005 |
| JP | 2007-166783 A | | 6/2007 |
| JP | 2007166783 A | * | 6/2007 |
| JP | 2008-295280 A | | 12/2008 |
| JP | 2010-166719 A | | 7/2010 |
| JP | 2010-252591 A | | 11/2010 |
| JP | 2011-172485 A | | 9/2011 |
| WO | WO 2016/002053 A1 | | 1/2016 |
| WO | WO-2016089032 A1 | * | 6/2016 .............. H02P 27/06 |
| WO | WO 2016/139734 A1 | | 9/2016 |

OTHER PUBLICATIONS

Japanese Office Action dated Jun. 5, 2018 in Japanese Patent Application No. 2018-524303 (with unedited computer generated English translation), 8 pages.

Decision of Refusal dated Aug. 28, 2018 in Japanese Patent Application No. 2018-524303 (with unedited computer generated English translation), 6 pages.

* cited by examiner

FIG.1
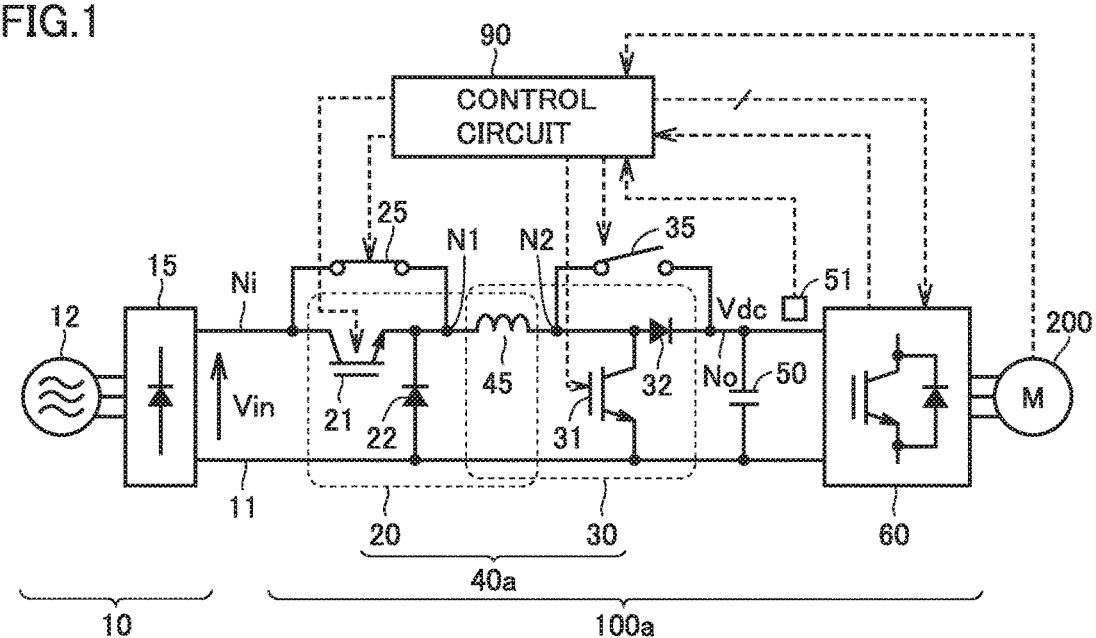
FIG.2
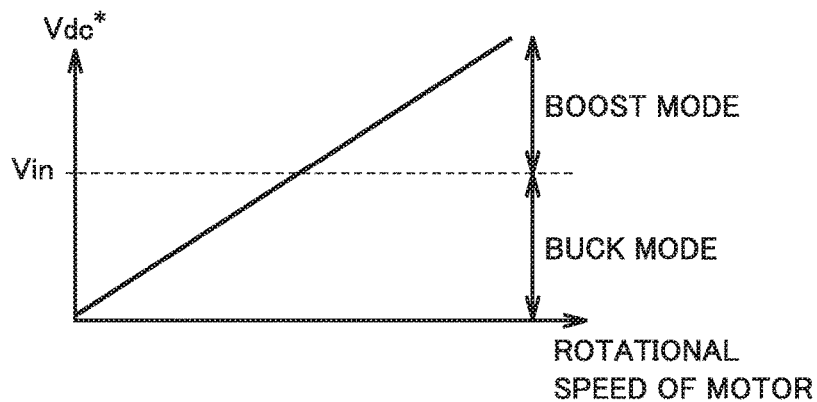
FIG.3
| MODE | SWITCHING ELEMENT 21 | SWITCHING ELEMENT 31 | BYPASS SWITCH 25 | BYPASS SWITCH 35 |
|---|---|---|---|---|
| BUCK MODE | PWM CONTROL | ALWAYS OFF | ALWAYS OFF | ALWAYS ON |
| BOOST MODE | ALWAYS ON | PWM CONTROL | ALWAYS ON | ALWAYS OFF |

FIG.13
| MODE | SWITCHING ELEMENT 21 | SWITCHING ELEMENT 73 | SWITCHING ELEMENT 74 | BYPASS SWITCH 25 | BYPASS SWITCH 35 |
|---|---|---|---|---|---|
| BUCK MODE | PWM CONTROL | ALWAYS OFF | ALWAYS OFF | ALWAYS OFF | ALWAYS ON |
| BOOST MODE | ALWAYS ON | PWM CONTROL | PWM CONTROL | ALWAYS ON | ALWAYS OFF |
FIG.14
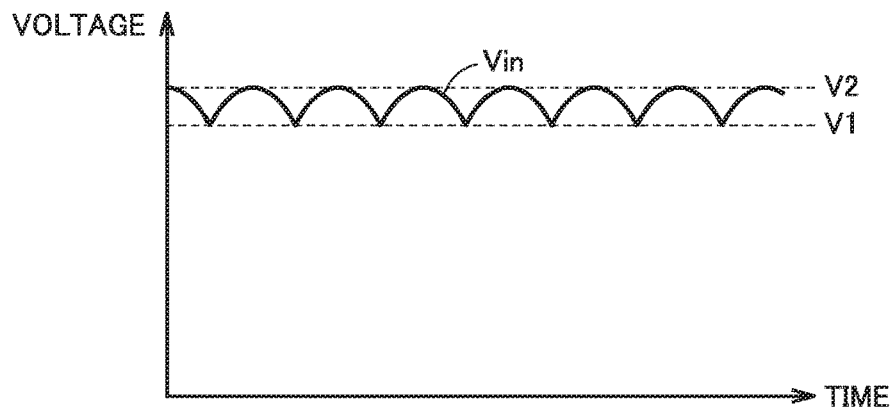
FIG.15
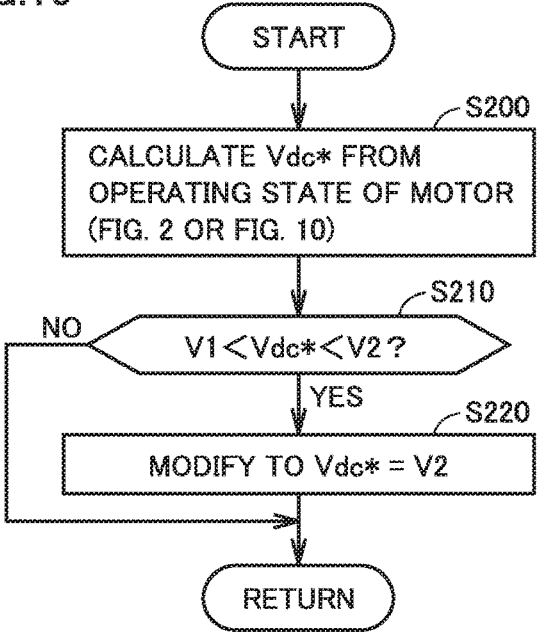

POWER CONVERSION DEVICE

TECHNICAL FIELD

The present invention relates to a power conversion device, and, more particularly, to a power conversion device for driving an AC motor.

BACKGROUND ART

Conventionally, a configuration is employed which variably controls direct-current (DC) voltage which is to be input to an inverter for performing DC-to-AC voltage conversion. For example, Japanese Patent Laying-Open No. 2010-166719 (PTL 1) discloses a motor drive control device for driving a compressor for an air conditioner, the motor drive control device having a configuration in which a boost converter is disposed between a DC power supply, configured of a three-phase alternating-current (AC) power supply and a three-phase rectifier circuit, and an inverter for supplying AC voltage to a motor.

Use of the boost converter can increase a DC voltage, which is to be input to the inverter, above an input voltage from the DC power supply. With this, the motor can be appropriately driven in a high rotational speed range where an induced voltage is increased, while avoiding an increased loss or a temperature increase due to an increase of the motor current.

WO2016/002053 (PTL 2) discloses a power conversion device having a configuration in which a multi-level chopper circuit is connected between a DC power supply and an inverter which are similar to PTL 1. The boost modes of the multi-level chopper circuit are switchable according to loading condition of an AC motor, thereby reducing the cost by size reduction of switching elements, and improving the operating range of the AC motor owing to an increase in step-up ratio.

CITATION LIST

Patent Literature

PTL 1: Japanese Patent Laying-Open No. 2010-166719
PTL 2: WO2016/002053

SUMMARY OF INVENTION

Technical Problem

However, PTLs 1 and 2 are unable to set the DC voltage, which is to be input to the inverter, below the input voltage from the DC power supply. For this reason, the input voltage to the inverter (i.e., the input voltage from the DC power supply) increases above the AC voltage, output from the inverter, in a low rotational speed range of the motor, ending up with an increase in motor iron losses or inverter losses. In other words, while PTLs 1 and 2 can improve the efficiency in a high rotational speed range (i.e., at heavy load), there is a problem in improvement of the efficiency at light load (i.e., a low rotational speed range).

The present invention is made to solve such a problem, and has an object to highly efficiently drive an AC motor according to an operating state of the AC motor in both the heavy load range and the light load range, in a power conversion device for driving the AC motor.

Solution to Problem

According to a certain aspect of the present invention, a power conversion device for driving an AC motor includes: an inverter for supplying AC voltage to the AC motor; a converter connected between a DC power supply and an inverter; a first bypass switch; a second bypass switch; and a control circuit. The converter includes: an input node; an output node; a buck circuit having a first semiconductor device; and a boost circuit having a second semiconductor device. A first DC voltage from the DC power supply is input to the input node. The output node is connected to the direct current side of the inverter. The boost circuit and the buck circuit are connected in series between the input node and the output node. The buck circuit is configured to perform a first power conversion for stepping down the voltage which is input during operation. The boost circuit is configured to perform a second power conversion for stepping up the voltage which is input during operation. The first bypass switch is connected in parallel with the first semiconductor device. The second bypass switch is connected in parallel with the second semiconductor device.

Advantageous Effects of Invention

According to the present invention, in the power conversion device for driving an AC motor, the AC motor can be highly efficiently driven in both the heavy load range and the light load range, according to an the operating state of an AC motor 200.

BRIEF DESCRIPTION OF DRAWINGS

FIG. 1 is a schematic circuit diagram for illustrating a configuration of a power conversion device according to Embodiment 1.

FIG. 2 is a conceptual diagram illustrating an example setting for a target voltage for a converter shown in FIG. 1.

FIG. 3 is a graph illustrating a circuit operation in each mode of operation of the converter.

FIG. 13 is a graph illustrating a circuit operation in each mode of operation of a converter in the power conversion device according to Embodiment 2.

FIG. 14 is a waveform diagram for an input voltage from a DC power supply shown in FIG. 1.

FIG. 15 is a flowchart illustrating a control process for setting a target voltage of a converter according to Embodiment 3.

DESCRIPTION OF EMBODIMENTS

Figure 4:
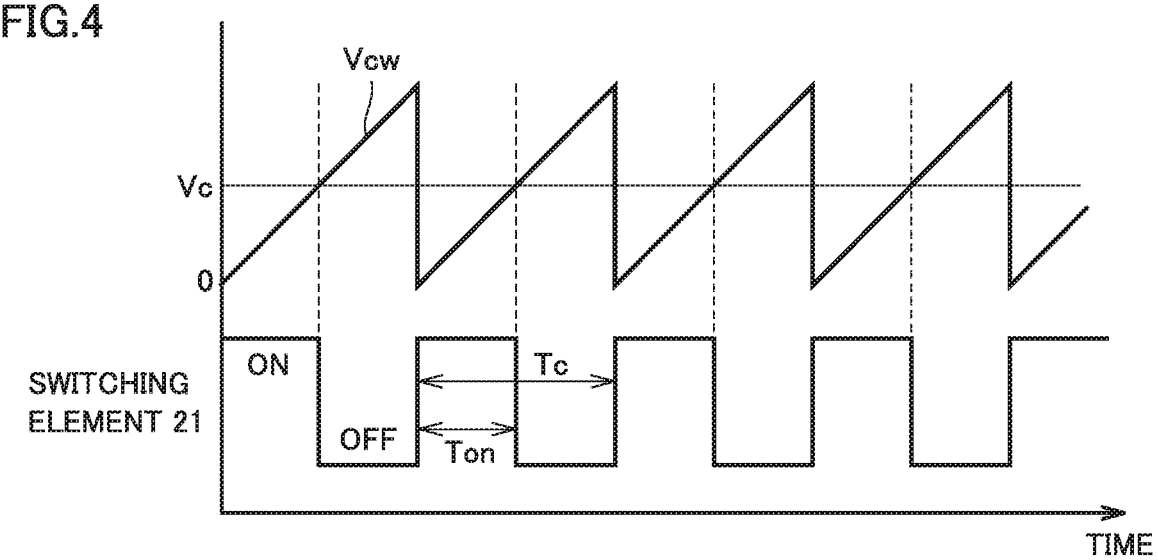
FIG. 4 shows example waveforms for illustrating PWM control in the converter.

Hereinafter, embodiments of the present invention will be described in detail, with reference to the accompanying drawings. Note that in the following, the same reference sign is used to refer to like or corresponding components in the drawings, and description thereof will in principle not be repeated.

Embodiment 1

FIG. 1 is a schematic circuit diagram for illustrating a configuration of a power conversion device according to Embodiment 1.

Referring to FIG. 1, a power conversion device 100a according to Embodiment 1 converts a direct-current (DC) voltage Vin from a DC power supply 10 into an alternating-current (AC) voltage for driving an AC motor 200.

DC power supply 10 can be configured of, for example, an AC power supply (e.g., a three-phase AC power supply) 12 and a rectifier circuit 15. Power conversion device 100a includes a converter 40a for performing DC-to-DC power conversion, a smoothing capacitor 50, an inverter 60 for performing DC-to-AC power conversion, and a control circuit 90. Control circuit 90 controls operations of converter 40 and inverter 60. Control circuit 90 is configured to implement each control function, described below, by software processing by execution of a pre-stored program, and/or hardware processing by a dedicated electronic circuit. For example, control circuit 90 can be configured of a microcomputer.

Converter 40a includes a buck circuit 20, a boost circuit 30, and bypass switches 25 and 35. As described below, buck circuit 20 and boost circuit 30 are configured to share a reactor 45.

Converter 40 has an input node Ni connected to the positive side of DC power supply 10. A reference voltage wiring 11 is connected to the negative side of DC power supply 10. This allows a DC voltage Vin (hereinafter, also referred to as an input voltage Vin) from DC power supply 10 to be input to converter 40a.

Buck circuit 20 includes a power semiconductor switching element (hereinafter, also simply referred to as a "switching element") 21, a diode 22, and reactor 45. Switching element 21 is connected between input node Ni and a node N1. Bypass switch 25 is electrically connected in parallel with switching element 21, between input node Ni and node N1.

In the present embodiment, the switching elements can be configured of an IGBT (Insulated Gate Bipolar Transistor) or a MOSFET (Metal-Oxide-Semiconductor Field-Effect Transistor). Note that semiconducting materials forming switching elements 21 and 31 and diodes 22 and 32 are not particularly limited, and, for example, SiC (silicon carbide), GaN (gallium nitride), etc. are also applicable, besides Si (silicon). Control circuit 90 controls on and off of switching element 21.

Diode 22 is electrically connected between reference voltage wiring 11 and node N1, and diode 22's forward direction is from reference voltage wiring 11 toward node N1. Reactor 45, shared between buck circuit 20 and boost circuit 30, is electrically connected between nodes N1 and N2. As such, switching element 21, diode 22, and reactor 45 can form what is called a buck chopper.

Boost circuit 30 includes switching element 31, diode 32, and reactor 45. Switching element 31 is electrically connected between node N2 and a reference voltage wiring 11. Bypass switch 35 is electrically connected in parallel with diode 32, between node N2 and reference voltage wiring 11. Circuit 90 controls on and off of switching element 31.

Diode 32 is electrically connected between node N2 and output node No, and diode 32's forward direction is from node N2 toward output node No of converter 40. Reactor 45, connected between node N1 and node N2, is shared between boost circuit 30 and buck circuit 20, as described above. As such, switching element 31, diode 32, and reactor 45 can form what is called a boost chopper.

Control circuit 90 controls on and off of bypass switches 25 and 35. Preferably, bypass switch 25 is configured of an element which has a lower on-resistance than on-resistance of switching element 21. Similarly, preferably, bypass switch 35 is configured of an element which has a lower on-resistance than on-resistance of diode 32. For example, bypass switches 25 and 35 can be configured using electromagnetic relays which are controlled to open and close according to an excitation signal from control circuit 90.

In the buck chopper (buck circuit 20), an on-period and an off-period of switching element 21 are repeatedly alternated. This switches between a current path including reactor 45 and switching element 21 and a current path including reactor 45 and diode 22, thereby performing power conversion of stepping down the input DC voltage (input voltage Vin in the example of FIG. 1). On the other hand, if switching element 21 is always on, the power conversion for stepping down the input DC voltage is stopped, and the input DC voltage passes through buck circuit 20, without being converted.

In other words, switching element 21 corresponds to one embodiment of "first semiconductor device," and the power conversion at the buck chopper by turning on and off the switching element 21 corresponds to one embodiment of "first power conversion." Moreover, bypass switch 25 corresponds to one embodiment of "first bypass switch."

In the boost chopper (boost circuit 30), an on-period and an off-period of switching element 31 are repeatedly alternated. This switches a current path including reactor 45 and switching element 31 and a current path including reactor 45 and diode 32, thereby performing power conversion of stepping up the input DC voltage (the voltage at node N1 in the example of FIG. 1). Specifically, power from DC power supply 10 is stored into reactor 45 as electromagnetic energy in an on-period of switching element 31, and the power from DC power supply 10 and the electromagnetic energy stored in reactor 45 are output to output node No via diode 32 in an off-period of switching element 31, thereby stepping up the input voltage Vin. On the other hand, when switching element 31 is turned off at all times, which turns on diode 32 at all times, the power conversion for stepping up the input DC voltage is stopped, and the input DC voltage passes through boost circuit 30, without being converted.

In other words, diode 32 corresponds to one embodiment of "second semiconductor device," and the power conversion at the boost chopper by turning on and off the switching element 31 corresponds to one embodiment of "second power conversion." Moreover, bypass switch 35 corresponds to one embodiment of "second bypass switch."

Output node No of converter 40 and reference voltage wiring 11 are connected to the DC link side of inverter 60. Smoothing capacitor 50 is connected between output node No and reference voltage wiring 11. Hereinafter, a DC voltage Vdc at output node No is also referred to as an output voltage Vdc. Output voltage Vdc is detected by a voltage sensor 51. Although not shown, it should be noted that a voltage sensor for detecting input voltage Vin can further be disposed. A detection value detected by each voltage sensor is input to control circuit 90.

Inverter 60 converts output voltage Vdc of converter 40a into an AC voltage for driving AC motor 200 at variable speeds. The output voltage (AC voltage) of inverter 60 is supplied to coil windings included in AC motor 200. AC motor 200 is configured of a three-phase AC motor, for example. Then, inverter 60 can be configured of a general three-phase inverter.

By control circuit 90 controlling on and off of multiple switching elements (not shown) disposed in the upper and lower arms at each phase, inverter 60 generates a pulse waveform voltage (hereinafter, also referred to as a PWM voltage) by PWM (Pulse Width Modulation) control of DC voltage Vdc. The PWM voltage from inverter 60 is supplied to the coil windings in AC motor 200, as a pseudo AC voltage for driving AC motor 200. For example, if AC motor 200 is a three-phase AC motor, inverter 60 supplies the coil windings at the respective phases with AC voltages (PWM voltages) whose phases are offset by every 120 degrees.

If AC motor 200 is configured of a synchronous motor, an induced voltage having amplitude that is according to the rotational speed of AC motor 200 is generated. When the amplitude of the pseudo AC voltage (PWM voltage), applied from inverter 60 to AC motor 200, is lower than the amplitude of the induced voltage, current flow through AC motor 200 is increased, causing concerns for increase of power losses in inverter 60 and AC motor 200, and a temperature increase. Accordingly, as also disclosed in PTLs 1 and 2, preferably, output voltage Vdc of converter 40 is controlled to be above input voltage Vin so that the amplitude (i.e., output voltage Vdc of converter 40a) of the PWM voltage is higher than the amplitude of the induced voltage.

On the other hand, when AC motor 200 is operating at a light load (e.g., low rotational speed), AC voltage from inverter 60 is controlled so that an effective value of the AC voltage is small. Here, in the configuration where the output voltage Vdc from converter 40 cannot be set below input voltage Vin as PTLs 1 and 2, a ripple component of the motor current increases because output voltage Vdc is too high, as compared to the AC voltage applied to AC motor 200, causing a concern for increased iron losses at AC motor 200. Increased switching losses at inverter 60 are also concerned.

Also for the case where AC motor 200 is configured of an induction motor, it is preferable, for efficiency purposes, that the amplitude of the PWM voltage is reduced when AC motor 200 is at a low rotational speed, and the amplitude of the PWM voltage is increased when AC motor 200 is at a high rotational speed.

Control circuit 90 sets a target value Vdc* (hereinafter, also referred to as a target voltage Vdc*) of output voltage Vdc of converter 40a, based on a detection value (e.g., rotational speed and/or current) of an operating state of AC motor 200 detected by a sensor (not shown), and controls the operation of converter 40a so that Vdc=Vdc* stands.

FIG. 2 is a conceptual diagram illustrating an example setting for target voltage Vdc* of converter 40a.

Referring to FIG. 2, target voltage Vdc* is set so as to increase in a high rotational speed range and decrease in a low rotational speed range according to a rotational speed of AC motor 200. For example, as illustrated in FIG. 2, target voltage Vdc* can be set in proportion to the rotational speed of AC motor 200.

Since converter 40a according to the present embodiment includes both buck circuit 20 and boost circuit 30, target voltage Vdc* can be set both in a range where Vdc*<Vin and in the range where Vin≤Vdc*.

Control circuit 90 selects a mode of operation of converter 40a, based on comparison between target voltage Vdc* and input voltage Vin. Specifically, converter 40a is operated in the boost mode when target voltage Vdc* is in a range where Vdc*≥Vin, and operated in the buck mode when target voltage Vdc* is in the range where Vdc*<Vin. Here, input voltage Vin compared with target voltage Vdc* can be a detection value detected by a voltage sensor (not shown). Alternatively, a constant value pre-set according to characteristics of DC power supply 10 may be compared with target voltage Vdc*.

FIG. 3 is a graph for illustrating a circuit operation in each mode of operation of converter 40a.

Referring to FIG. 3, in the buck mode, buck circuit 20 is operating, and boost circuit 30 is stopped. Buck circuit 20 configured of the buck chopper can control output voltage Vdc in a range where Vdc≤Vin by PWM control of the switching element 21. The buck mode corresponds to "second mode."

In the buck mode where only the buck chopper (buck circuit 20) is operating, Equation (1) below stands between output voltage Vdc and input voltage Vin, where DT denotes a duty ratio.

$$Vdc = DT \cdot Vin \quad (1)$$

FIG. 4 shows example waveforms for illustrating the PWM control at the converter.

Referring to FIG. 4, in the PWM control, switching element 21 is turned on and off, according to voltage comparison between voltage Vcw of a carrier wave composed of a periodic signal (e.g., a sawtooth wave or a triangular wave) and a control voltage Vc corresponding to a target duty ratio DT*.

Target duty ratio DT* can be set as DT*=(Vdc*/Vin) from Equation (1). Alternatively, target duty ratio DT* can also be calculated by further adding a feedback term of a voltage deviation which is ΔVdc=(Vdc*−Vdc).

In the buck chopper, switching element 21 is off in a period where Vcw>Vc, and switching element 21 is on in a period where Vc>Vcw. A ratio of on-period Ton of switching element 21 to a switching cycle Tc, which is a sum of the on-period and the off-period of switching element 21, corresponds to duty ratio DT (DT=Ton/Tc) in Equation (1). Control voltage Vc can be set according to a product of the amplitude of the carrier wave and target duty ratio DT*.

Referring back to FIGS. 3 and 2, in the buck mode, buck circuit 20 controls on and off of switching element 21 to output, to node N2, a DC voltage generated by stepping down input voltage Vin. On the other hand, boost circuit 30 turns off switching element 31 at all times to stop the power conversion.

Figure 5:
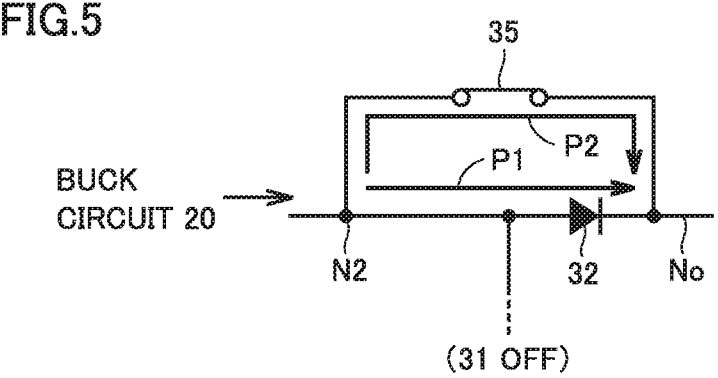
FIG. 5 is a partial circuit diagram illustrating an operation of a boost circuit in a buck mode.

FIG. 5 is a partial circuit diagram illustrating operation of boost circuit 30 in the buck mode.

Referring to FIG. 5, in the buck mode, boost circuit 30 needs to turn off switching element 31 at all times to stop the power conversion (boost operation), and form a path through which the voltage (stepped down voltage), output from buck circuit 20 to node N2, is allowed to pass, without being converted, and transmitted to output node No.

Switching element 31 being off at all times causes diode 32 to be conductive (on) in boost circuit 30, allowing a current path P1 from node N2 to output node No to be formed at all times. Furthermore, a current path P2 from node N2 to output node No can also be formed by turning on bypass switch 35 at all times.

As such, providing current path P2, formed by bypass switch 35, in parallel with diode 32 can lower the electrical resistance value of the path through which the output voltage of buck circuit 20 is transmitted to output node No in the buck mode, thereby reducing power losses of converter 40*a*.

Figure 6:
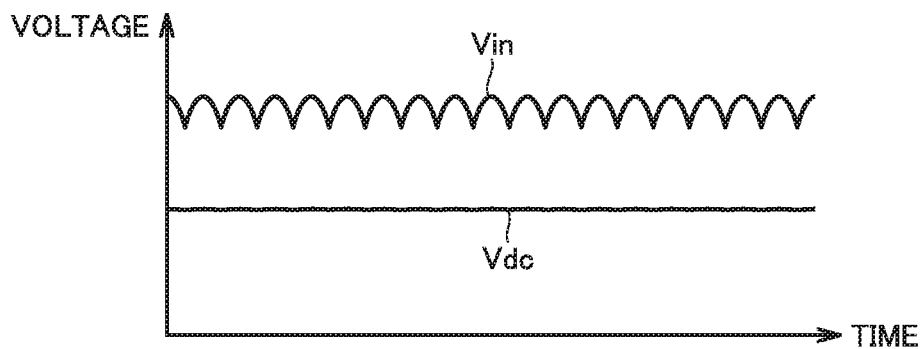
FIG. 6 is an example waveform diagram of an output voltage in the buck mode.

FIG. 6 shows example waveforms of the output voltage in the buck mode.

Referring to FIG. 6, when DC power supply 10 is configured of a three-phase AC power supply and a rectifier circuit, input voltage Vin includes a ripple having a frequency that is thrice the power supply frequency. In the buck mode, buck circuit 20 performs the power conversion (buck) according to target voltage Vdc*, which is set to be in the range where Vdc*<Vin, and the output voltage of buck circuit 20 is transmitted to output node No through the path including bypass switch 35, thereby controlling DC voltage Vdc to be target voltage Vdc*.

Referring back to FIGS. 3 and 2, in the boost mode, buck circuit 20 turns on switching element 21 at all times to stop the power conversion (buck operation). The boost mode corresponds to "first mode."

Figure 7:
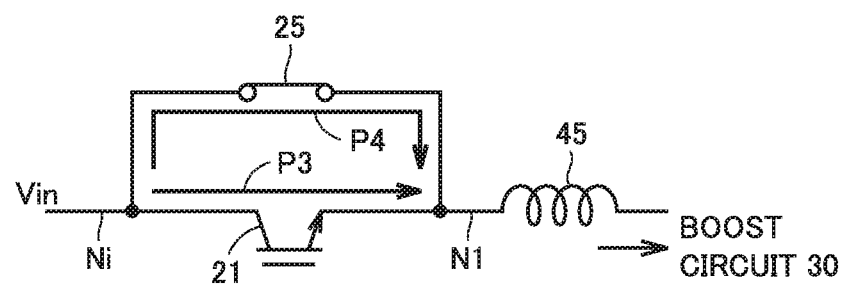
FIG. 7 is a partial circuit diagram illustrating an operation of a buck circuit in a boost mode.

FIG. 7 is a partial circuit diagram illustrating operation of buck circuit 20 in the boost mode.

Referring to FIG. 7, in the boost mode, buck circuit 20 turns on switching element 21 at all times to stop the power conversion (buck operation). In the boost mode, on the other hand, buck circuit 20 needs to form a path through which input voltage Vin is transmitted from input node Ni to node N1.

Buck circuit 20 allows for the formation of a current path P3 from input node Ni to node N1 owing to switching element 21 being on at all times. Furthermore, a current path P4 from input node Ni to node N1 can be formed by turning on bypass switch 25 at all times.

As such, providing current path P4, formed by bypass switch 25, in parallel with switching element 21 can lower the electrical resistance value of the path through which input voltage Vin is transmitted to boost circuit 30 in the boost mode. Note that in the boost mode, after a current flows through bypass switch 25, current path P3 can be blocked by turning off switching element 21.

Referring back to FIGS. 3 and 2, in the boost mode, boost circuit 30, configured of a boost chopper, can step up input voltage Vin by the PWM control of switching element 31, to control output voltage Vdc (Vdc≥Vin).

In the boost mode where only the boost chopper (boost circuit 30) is operating, Equation (2) below stands between output voltage Vdc and input voltage Vin, where DT denotes a duty ratio that is defined by a ratio of the on-period of switching element 31 to the switching cycle Tc.

$$Vdc = 1/(1-DT) \cdot Vin \qquad (2)$$

In the boost mode, control voltage Vc can be set using target duty ratio DT* obtained by rearranging Equation (2), in the PWM control described with reference to FIG. 4. Specifically, target duty ratio DT* can be calculated by Equation (3) below.

$$DT^* = 1.0 - 1/(Vdc^*/Vin) \qquad (3)$$

Note that, as described with respect to the control by buck circuit 20, target duty ratio DT* can also be calculated by further adding a feedback term, based on voltage deviation ΔVdc=(Vdc*−Vdc), to the value calculated by Equation (3).

Figure 8:
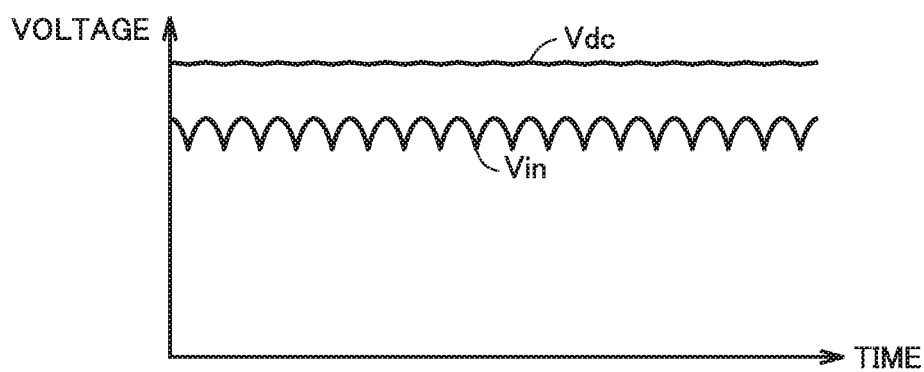
FIG. 8 is an example waveform diagram of an output voltage in the boost mode.

FIG. 8 shows example waveforms of the output voltage in the boost mode.

Referring to FIG. 8, as with FIG. 7, in input voltage Vin includes a ripple having a frequency that is thrice the power supply frequency. In the boost mode, input voltage Vin is transmitted to boost circuit 30 through a path including bypass switch 25. Furthermore, boost circuit 30 performs the power conversion (boost) according to target voltage Vdc* set to be in the range where Vdc*>Vin, thereby controlling DC voltage Vdc to be target voltage Vdc*.

As described above, in the power conversion device according to Embodiment 1, converter 40*a* is configured to selectively operate the boost circuit and the buck circuit, thereby controlling DC voltage Vdc, which is to be input to inverter 60 for driving AC motor 200, both in higher and lower voltage ranges than input voltage Vin. Furthermore, the power losses of converter 40*a*, which selectively operates buck circuit 20 and boost circuit 30, can be reduced by bypass switches 25 and 35. As a result, AC motor 200 can be highly efficiently driven, according to an operating state of AC motor 200, in both the heavy load range and the light load range.

Variation 1 of Embodiment 1

Variation 1 of Embodiment 1 will be described with reference to another example setting for target voltage Vdc* of converter 40*a*. Specifically, an example will be illustrated in which target voltage Vdc* is set so that an index for the power conversion by inverter 60 is constant.

Figure 9:
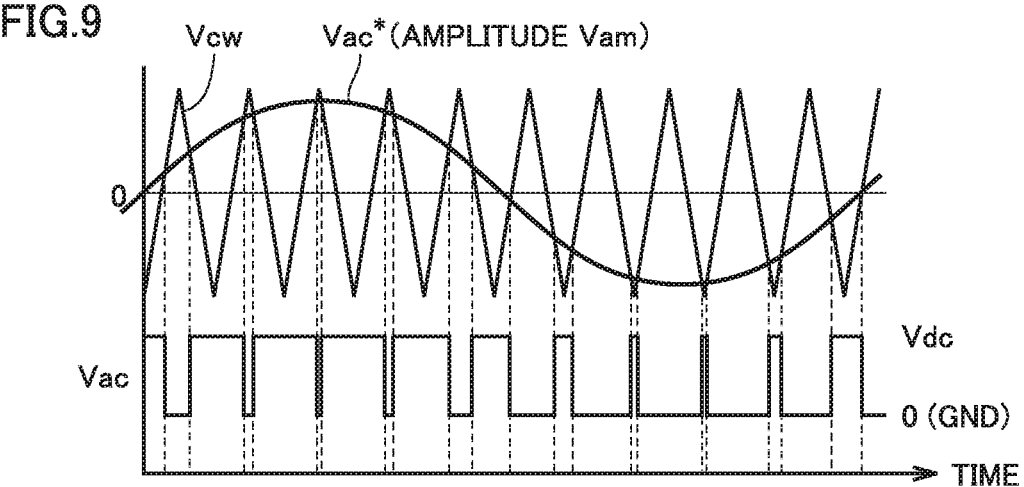
FIG. 9 is a schematic waveform diagram for illustrating PWM control for DC-to-AC voltage conversion in the inverter.

FIG. 9 is a schematic waveform diagram for illustrating the PWM control for DC-to-AC voltage conversion at inverter 60.

Referring to FIG. 9, a voltage command (phase voltage) Vac* indicates a sinusoidal voltage which should be applied to each phase coil winding included in AC motor 200. In a three-phase AC motor, a voltage command Vac* is generated as sinusoidal voltages whose phases are shifted by 120 degrees each. For example, voltage command Vac* can be determined by current feedback control over the respective phases of AC motor 200. The torque of AC motor 200 is controllable by the amplitude of voltage command Vac*. Voltage command Vac* has a frequency corresponding to the rotational speed of AC motor 200.

The PWM control by inverter 60 outputs, to AC motor 200, a PWM voltage which has amplitude of DC voltage Vdc input from converter 40*a*. The on and off of switching elements (not shown) constituting inverter 60 are controlled according to voltage comparison between voltage Vcw of a triangular carrier wave and voltage command Vac*, thereby generating a PWM voltage according to voltage command Vac*. The fundamental wave component of the PWM voltage corresponds to voltage command Vac*. The peak-to-peak value of carrier wave voltage Vcw in the PWM control corresponds to DC voltage Vdc from converter 40*a*.

In general, a modulation rate K1 and voltage utilization K2 of inverter 60 are known to be indicated by Equation (4) and Equation (5), respectively, below.

$$K1=Vam/(Vdc/2) \quad (4)$$

$$K2=\sqrt{2} \cdot Vlm/Vdc \quad (5)$$

Note that Vam in Equation (4) is amplitude of Vac*. In Equation (5), Vlm is an effective value of a line voltage at AC motor 200 which is generated by Vac* (phase voltage), and has a relationship: Vlm=$\sqrt{3/2}$·Vam.

Figure 10:
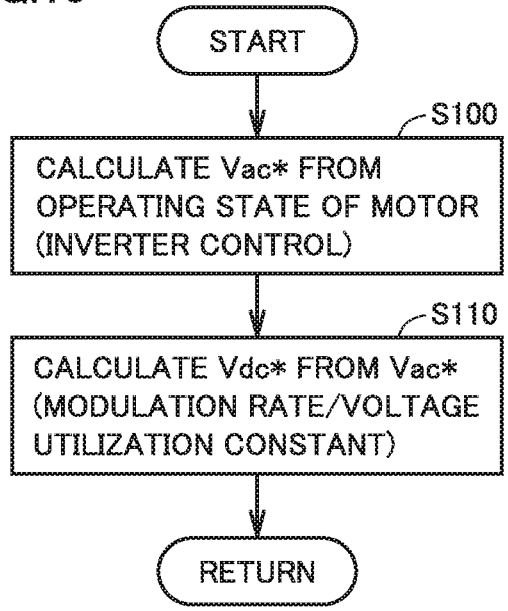
FIG. 10 is a flowchart illustrating a control process for setting a target voltage of a converter, according to Variation 1 of Embodiment 1.

FIG. 10 is a flowchart illustrating a control process for setting a target voltage for the converter, according to Variation 1 of Embodiment 1.

Referring to FIG. 10, control circuit 90, at step S100, calculates AC voltage command Vac* from an operating state of AC motor 200. For example, AC voltage command Vac* is determined so as to have an amplitude and a frequency for appropriately controlling the torque and/or rotational speed of AC motor 200 by feedback control of the rotational speed and/or current of AC motor 200.

Control circuit 90, at step S110, calculates target voltage Vdc* from AC voltage command Vac* (amplitude Vam), determined at step S100, according to Equation (4) or Equation (5).

For example, target voltage Vdc* can be calculated so that K1 is a constant value (e.g., K1=1.0, that is, modulation rate=100(%)) in Equation (4), or K2 is a constant value (e.g., K2=1.0, that is, the voltage utilization=100(%)) in Equation (5). Alternatively, the constant values above can be set greater than 1.0 so that inverter 60 operates in over-modulation operation. When inverter 60 is in over-modulation operation, while the voltage waveform is distorted, the efficiency of inverter 60 can improve.

As such, in the power conversion device according to Embodiment 1, target voltage Vdc* of converter 40a can be appropriately set to correspond to the operating state of AC motor 200 by setting target voltage Vdc* so that the modulation rate or voltage utilization of inverter 60 is constant, rather than by setting target voltage Vdc* according to the rotational speed of AC motor 200 as shown in FIG. 2.

Variation 2 of Embodiment 1

Figure 11:
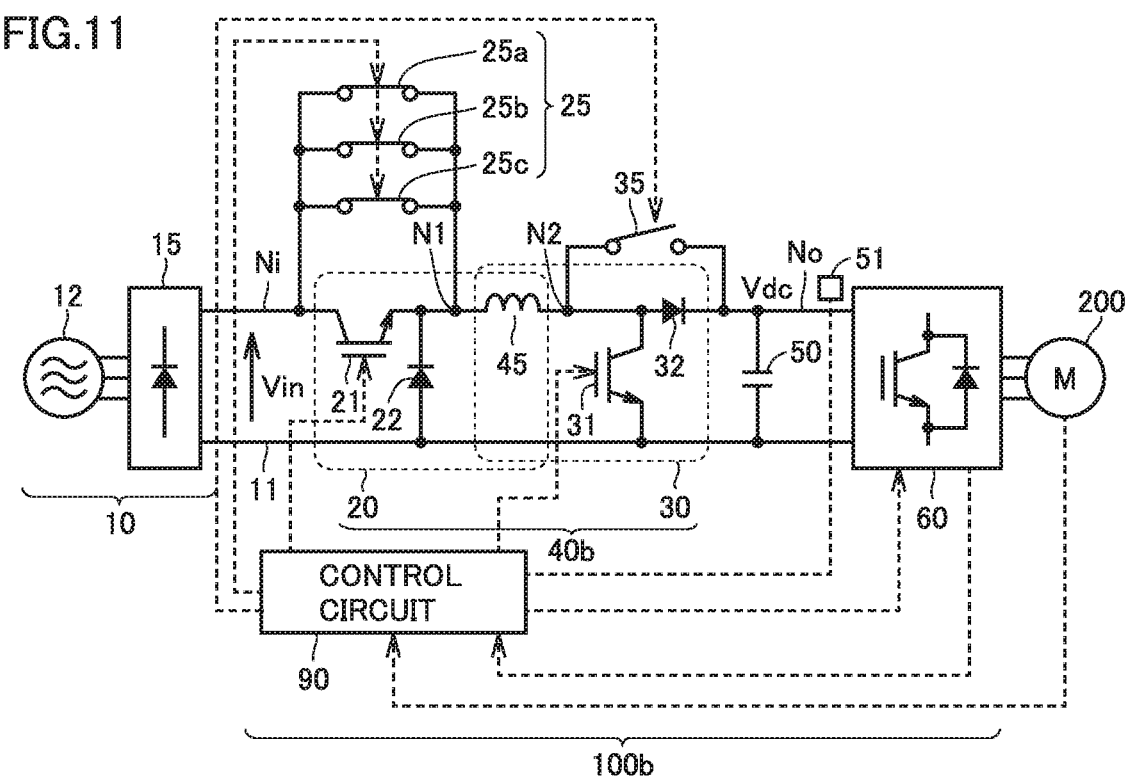
FIG. 11 is a schematic circuit diagram for illustrating a configuration of a power conversion device according to Variation 2 of Embodiment 1.

FIG. 11 is a schematic circuit diagram for illustrating a configuration of a power conversion device 100b, according to Variation 2 of Embodiment 1.

Comparing FIG. 11 with FIG. 1, power conversion device 100b according to Variation 2 of Embodiment 1 includes a converter 40b, instead of converter 40a (FIG. 1). Converter 40b is different from converter 40a in that a bypass switch 25, disposed in correspondence with buck circuit 20, is configured of multiple (three in the example of FIG. 11) switching elements 25a, 25b, and 25c which are connected in parallel. Switching elements 25a to 25c are controlled in common by control circuit 90. In other words, on and off of switching elements 25a to 25c are controlled in the same manner as bypass switch 25. Switching elements 25a to 25c can also be configured of electromagnetic relays, for example.

The configurations and operations of any other components included in converter 40b are the same as converter 40a, and the configurations and operations of any other components included in power conversion device 100b are the same as power conversion device 100a, except for converter 40b. Thus, detailed description thereof will not be repeated. Accordingly, the control of output voltage Vdc by converter 40b is the same as converter 40a according to Embodiment 1, and the control of AC motor 200 by inverter 60 is also the same as Embodiment 1.

Configuring the bypass switch by multiple switches (e.g., electromagnetic relays) connected in parallel facilitates securement of the current capacity. In particular, to support a large capacity, the current capacity is secured using relatively inexpensive switches having low capacity, thereby reducing the cost, as compared to by increasing the capacity of a single bypass switch.

While FIG. 11 has been described with reference to configuring bypass switch 25 by multiple switching elements connected in parallel, it should be noted that the same configuration is applicable to bypass switch 35 that is disposed in correspondence with boost circuit 30.

In other words, according to Variation 2 of Embodiment 1, configuring bypass switch 25 and/or 35 by multiple switching elements connected in parallel facilitates the securement of the current capacity, while reducing the cost.

Embodiment 2

Figure 12:
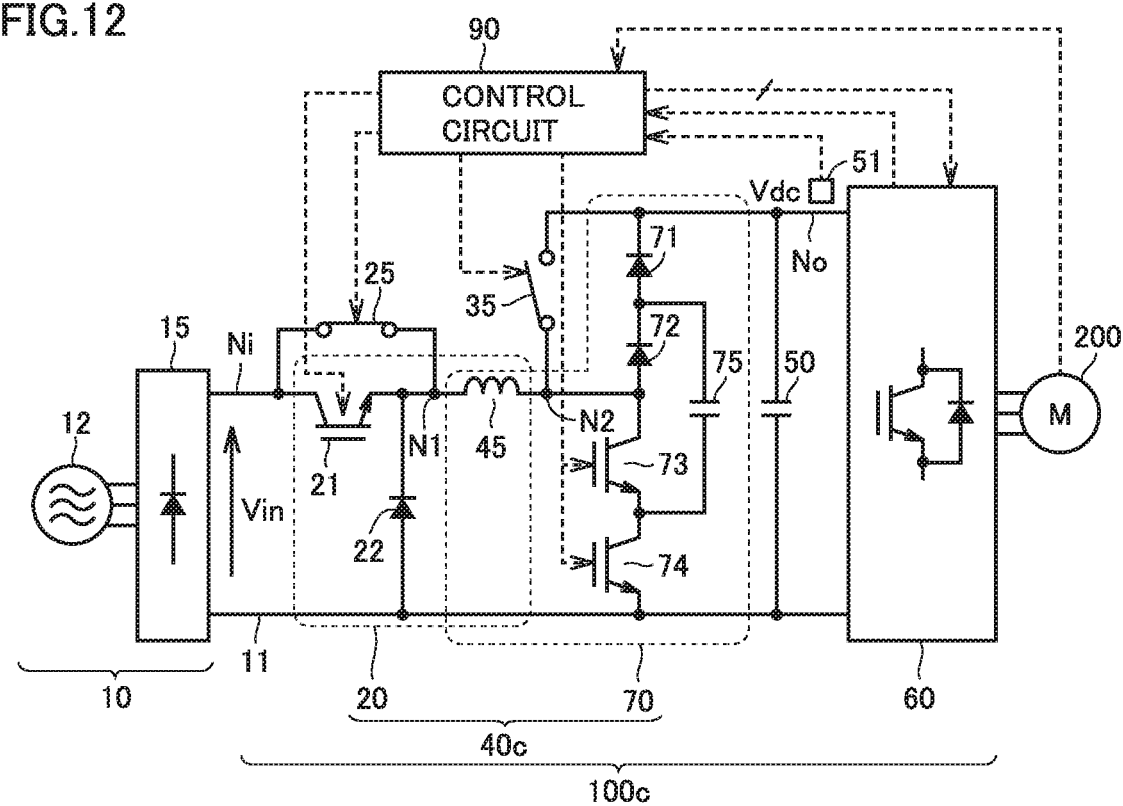
FIG. 12 is a schematic circuit diagram for illustrating a configuration of a power conversion device according to Embodiment 2.

FIG. 12 is a schematic circuit diagram for illustrating a configuration of a power conversion device according to Embodiment 2.

Comparing FIG. 12 with FIG. 1, a power conversion device 100c according to Embodiment 2 includes a converter 40c, instead of converter 40a (FIG. 1). Converter 40c is different from converter 40a in that converter 40c has a boost circuit 70, instead of boost circuit 30.

Boost circuit 70 includes diodes 71 and 72, switching elements 73 and 74, an intermediate capacitor 75, and a reactor 45 shared with a buck circuit 20.

Diodes 71 and 72 are connected in series between a node N2 and an output node No. Diodes 71 and 72's forward directions are from node N2 toward output node No.

Switching elements 73 and 74 are connected in series between node N2 and a reference voltage wiring 11. Intermediate capacitor 75 is electrically connected between a point of connection between diodes 71 and 72 and a point of connection between switching elements 73 and 74. Control circuit 90 controls on and off of switching elements 73 and 74.

Reactor 45 is electrically connected between nodes N1 and N2, and shared between buck circuit 20 and boost circuit 70, as with Embodiment 1. Boost circuit 70 has the same circuit structure as the multi-level chopper circuit disclosed in PTL 2.

In converter 40c also, bypass switch 35 is connected between node N2 and output node No. In other words, bypass switch 35 is connected in parallel with diodes 71 and 72, and in converter 40c, diode 71 and diode 72 correspond to "first diode and second diode," respectively, and one embodiment of "second semiconductor device" can be configured by diodes 71 and 72. Node N2 corresponds to "intermediate node," and switching element 73 and switching element 74 correspond to "first switching element and second switching element," respectively.

The configurations and operations of any other components included in converter 40c are the same as converter 40a, and the configurations and operations of any other components included in power conversion device 100c are the same as power conversion device 100a, except for converter 40c. Thus, detailed description thereof will not be repeated. Target voltage Vdc* of converter 40c can also be set to correspond to an operating state of AC motor 200, according to Embodiment 1 or Variation 1 thereof.

In Embodiment 2 also, each of bypass switches 25 and 35 can be configured by multiple switching elements connected in parallel, as with Variation 1 of Embodiment 1.

FIG. 13 shows a circuit operation in each mode of operation of converter 40c according to Embodiment 2.

Referring to FIG. 13, in the buck mode applied when target voltage Vdc* is in a range where Vdc*<Vin, buck circuit 20 can control output voltage Vdc according to target voltage Vdc* (Vdc*≤Vin), by the PWM control of switching element 21 as described in Embodiment 1. Bypass switch 25, connected in parallel with switching element 21 which is PWM controlled, is off at all times, as with Embodiment 1.

In the buck mode, boost circuit 70 turns off switching elements 73 and 74 at all times to stop power conversion (boost operation). On the other hand, boost circuit 70 needs to form a path through which the voltage output from buck circuit 20 to node N2 is transmitted as output voltage Vdc to output node No.

In the buck mode, bypass switch 35 is on at all times, as with Embodiment 1. This can lower, in the buck mode, the electrical resistance value of a path through which the output voltage (corresponding to Vdc) of buck circuit 20 is transmitted to output node No, as compared to using only diodes 71 and 72 to transmit the output voltage of buck circuit 20.

In the boost mode applied when target voltage Vdc* is in a range where Vdc*≥Vin, switching element 21 is on at all times and bypass switch 25 is also on, as with Embodiment 1. This causes buck circuit 20 to stop power conversion (buck operation) and allows for formation of a path through which input voltage Vin of input node Ni is transmitted to node N1 that is corresponding to the input node of the boost chopper. As described in Embodiment 1, switching element 21 can be turned off after current flows through bypass switch 25.

On the other hand, boost circuit 70 performs a power conversion of stepping up input voltage Vin by PWM control of switching elements 73 and 74. Boost circuit 70 can perform the PWM control of switching elements 73 and 74, combining at least some of: a first period in which only switching element 74 is on; a second period in which only switching element 73 is on; a third period in which switching elements 73 and 74 are on; and a fourth period in which switching elements 73 and 74 are off, as shown in FIG. 3 of PTL 2. In particular, the first period and the second period can be alternately provided by alternately turning on and off the switching elements 73 and 74 by PWM control using carrier waves whose phases are shifted by 180 degrees.

In the first through fourth periods above, different current paths, each including reactor 45, are formed. Accordingly, boost circuit 70 provides a period for storing power from DC power supply 10 in reactor 45 and intermediate capacitor 75, while switching the current paths including reactor 45, thereby performing a power conversion (i.e., "second power conversion") of stepping up the input voltage transmitted to node N2.

Accordingly, boost circuit 70, similarly to boost circuit 30, can generate output voltage Vdc at output node No, which is greater than the DC voltage at node N2, according to target voltage Vdc*, at which time on and off of switching elements 73 and 74 are controlled (i.e., the first through fourth periods are set) so as to control the voltage of intermediate capacitor 75 to be Vdc/2, thereby reducing the losses at switching elements 73 and 74 and inhibiting the ripple in output voltage Vdc.

As a result, converter 40c can enhance its efficiency in the boost mode. On the other hand, since two diodes 71 and 72 are connected in the path between node N2 and output node No in boost circuit 70, increased losses in the path in the buck mode are a concern. However, the efficiency of converter 40c in the buck mode can be maintained equally to converter 40a by disposing bypass switch 35.

As such, according to the power conversion device of Embodiment 2, the efficiency of the power conversion device in the boost mode can be enhanced by boost circuit 70 that includes a large number of semiconductor device, and the efficiency of the power conversion device in the buck mode can be maintained by bypass switch 35.

Note that any boost circuit having the boost function and configured with a semiconductor device can be disposed, instead of boost circuit 70 (the multi-level chopper circuit) according to Embodiment 2. In this case also, the same advantages effects can be obtained by connecting, in parallel with the semiconductor device included in the boost circuit in the buck mode, a bypass switch for forming a voltage transmission path bypassing the boost circuit.

Similarly, in each embodiment, any buck circuit having the buck function and configured with a semiconductor device can be disposed in buck circuit 20, instead of the buck chopper. In this case also, the same advantages effects can be obtained by connecting, in parallel with the semiconductor device included in the buck circuit in the boost mode, a bypass switch for forming a voltage transmission path bypassing buck circuit 20.

Embodiment 3

Embodiment 3 will be described with reference to a preferable example of control when an input voltage Vin has a ripple component because a DC power supply is configured by an AC power supply and a rectifier circuit.

FIG. 14 shows example waveforms of input voltage Vin from a DC power supply 10.

Referring to FIG. 14, a ripple voltage having a frequency six times the power supply frequency is generated in input voltage Vin due to rectification of three-phase AC voltage. This causes input voltage Vin to vary periodically between an upper limit value V1 corresponding to the amplitude of the three-phase AC voltage and a lower limit value V2. Lower limit value V2 can be predetermined based on a supply voltage value.

Due to the variation of input voltage Vin as such, the boost mode and the buck mode are frequently switched when a target voltage Vdc*, set to correspond to an operating state of AC motor 200, is within a range from V1 to V2, causing a concern for destabilization of the operation of converters 40a to 40c.

Accordingly, in Embodiment 3, target voltage Vdc* is set so that the operations of power conversion devices 100a to 100c described in Embodiments 1 and 2 and the variations thereof are stabilized.

FIG. 15 is a flowchart illustrating a method of setting a target voltage of a converter according to Embodiment 3.

Referring to FIG. 15, at step S200, a control circuit 90 sets a target voltage Vdc* of converters 40a to 40c to correspond to an operating state of AC motor 200, according to the description with reference to FIG. 2 or 10. In other words, at step S200, an ideal value of Vdc that is based on the operating state of AC motor 200 is calculated.

Control circuit 90, at step S210, determines whether target voltage Vdc* calculated at step S200 is within a range where V1<Vdc*<V2. If target voltage Vdc* is within the range where V1<Vdc*<V2 (YES at S210), use of target voltage Vdc* as is causes a concern that the boost mode and the buck mode may frequently switch. Thus, the control circuit modifies target voltage Vdc* to target voltage Vdc*=V2 at step S220. This causes converters 40a to 40c to operate in the boost mode.

On the other hand, if target voltage Vdc* is out of the range where V1<Vdc*<V2 (NO at S210), control circuit 90 skips step S220 and maintains target voltage Vdc* set at step S200.

Figure 16:
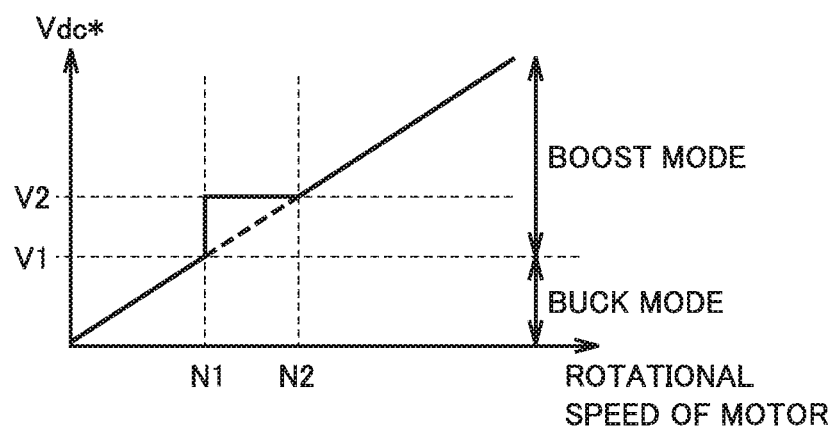
FIG. 16 is a conceptual diagram illustrating the setting of the target voltage of the converter and selection of a mode of operation of the converter, according to Embodiment 3.

FIG. 16 shows an example of setting for target voltage Vdc* of the converter and selection of a mode of operation of the converter, according to Embodiment 3.

Referring to FIG. 16, as target voltage Vdc* is set in proportion to the rotational speed of AC motor 200, as with FIG. 2, if the rotational speed is in a range higher than N1 and N2 or less, target voltage Vdc* is set to the range where V1<Vdc*<V2 at step S200, as indicated by the dotted line.

As indicated by the solid line in FIG. 16, if target voltage Vdc* is within the voltage range where V1<Vdc*<V2, target voltage Vdc* is forcibly modified to Vdc*=V2 by the processes at steps S210 through S220. Accordingly, when the rotational speed is in the range from N1 to N2, the boost mode is continuously applied, thereby avoiding the frequent switching between the boost mode and the buck mode, causing converters 40a to 40c to stably operate.

Note that if target voltage Vdc* is within the range where V1<Vdc*<V2, the amplitude of AC voltage (the PWM voltage) of inverter 60 can be maintained above an induced voltage of AC motor 200 by applying the boost mode, rather than the buck mode, thereby preventing a significant reduction in efficiency of AC motor 200.

As such, according to the power conversion device of Embodiment 3, the DC power supply for the power conversion device is configured of an AC power supply and a rectifier circuit, thereby allowing stable operation of the power conversion device even when the input voltage has a ripple component.

Embodiment 4

Embodiment 4 will be described with reference to another preferable example of control when an input voltage Vin has a ripple component because a DC power supply is configured by an AC power supply and a rectifier circuit. The way of switching between the buck mode and the boost mode in Embodiment 4 is different from Embodiment 3.

Figure 17:
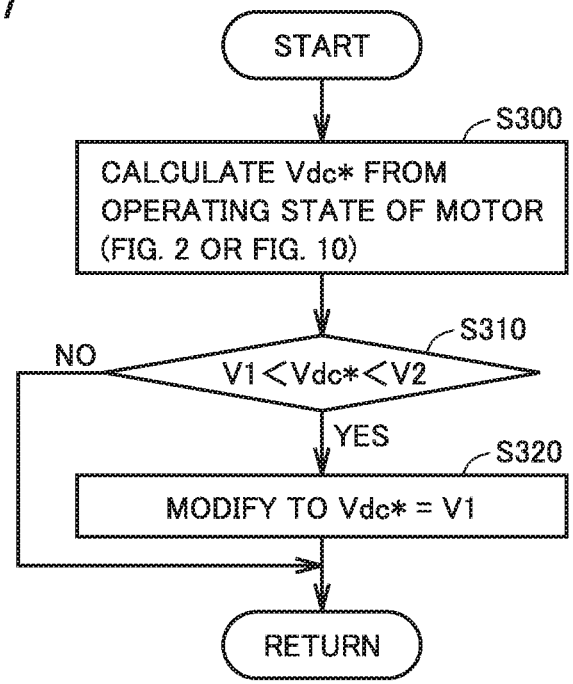
FIG. 17 is a flowchart illustrating a control process for setting a target voltage of a converter, according to Embodiment 4.

FIG. 17 is a flowchart illustrating a method of setting a target voltage for a converter according to Embodiment 4.

Referring to FIG. 17, control circuit 90 sets target voltage Vdc* of converters 40a to 40c to correspond to an operating state of AC motor 200 at step S300. At step S300 also, as with step S200 of FIG. 15, an ideal value of Vdc that is based on the operating state of AC motor 200 can be calculated, according to the description with reference to FIG. 2 or 10.

Control circuit 90 determines whether target voltage Vdc* calculated at step S300 is within the range where V1<Vdc*<V2 at step S310. If target voltage Vdc* is within the range where V1<Vdc*<V2 (YES at S310), use of target voltage Vdc* as is causes a concern that the boost mode and the buck mode may frequently switch. Thus, the control circuit modifies target voltage Vdc* to target voltage Vdc*=V1 at step S320. This causes converters 40a to 40c to operate in the buck mode.

On the other hand, if target voltage Vdc* is out of the range where V1<Vdc*<V2 (NO at S310), control circuit 90 skips step S320 and maintains target voltage Vdc* set at step S300.

Figure 18:
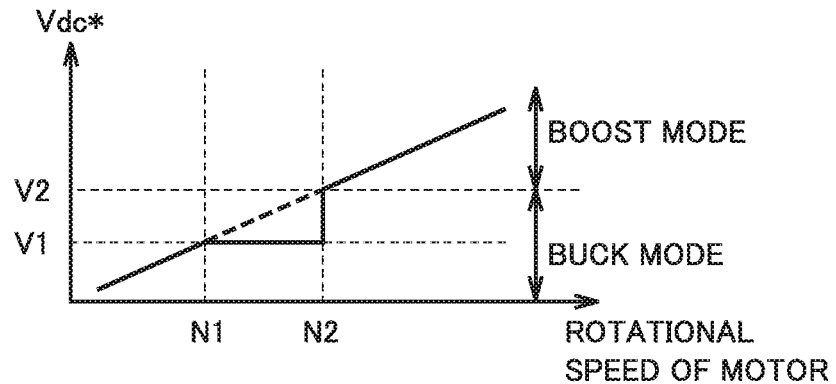
FIG. 18 is a conceptual diagram illustrating the setting of the target voltage of the converter and selection of a mode of operation of the converter, according to Embodiment 4.

FIG. 18 shows an example of setting for target voltage Vdc* of the converter and selection of a mode of operation of the converter, according to Embodiment 4.

Referring to FIG. 18, as target voltage Vdc* is set in proportion to the rotational speed of AC motor 200, as with FIG. 2, if the rotational speed is in a range higher than N1 and N2 or less, target voltage Vdc* is set to a range where V1<Vdc*<V2 at step S300, as indicated by the dotted line.

As indicated by the solid line in FIG. 18, if target voltage Vdc* is within the voltage range where V1<Vdc*<V2, target voltage Vdc* is forcibly modified to Vdc*=V1 by the processes at steps S310 through S320. Accordingly, when the rotational speed is in the range from N1 to N2, the buck mode is continuously applied, thereby avoiding the frequent switching between the boost mode and the buck mode, causing converters 40a to 40c to stably operate.

If target voltage Vdc* is within the range where V1<Vdc*<V2, by applying the buck mode, rather than the boost mode, while the efficiency of AC motor 200 suffers as compared to the boost mode, the voltage at smoothing capacitor 50 decreases, thereby reducing losses of inverter 60 caused by switching of inverter 60.

As such, the power conversion device according to Embodiment 4 can also stably operate even when the input voltage has a ripple component, as with the power conversion device according to Embodiment 3.

Embodiment 5

Embodiment 5 will be described with reference to an control example for highly efficiency operating a power conversion device when an input voltage Vin has a ripple component, as with Embodiments 3 and 4.

Figure 19:
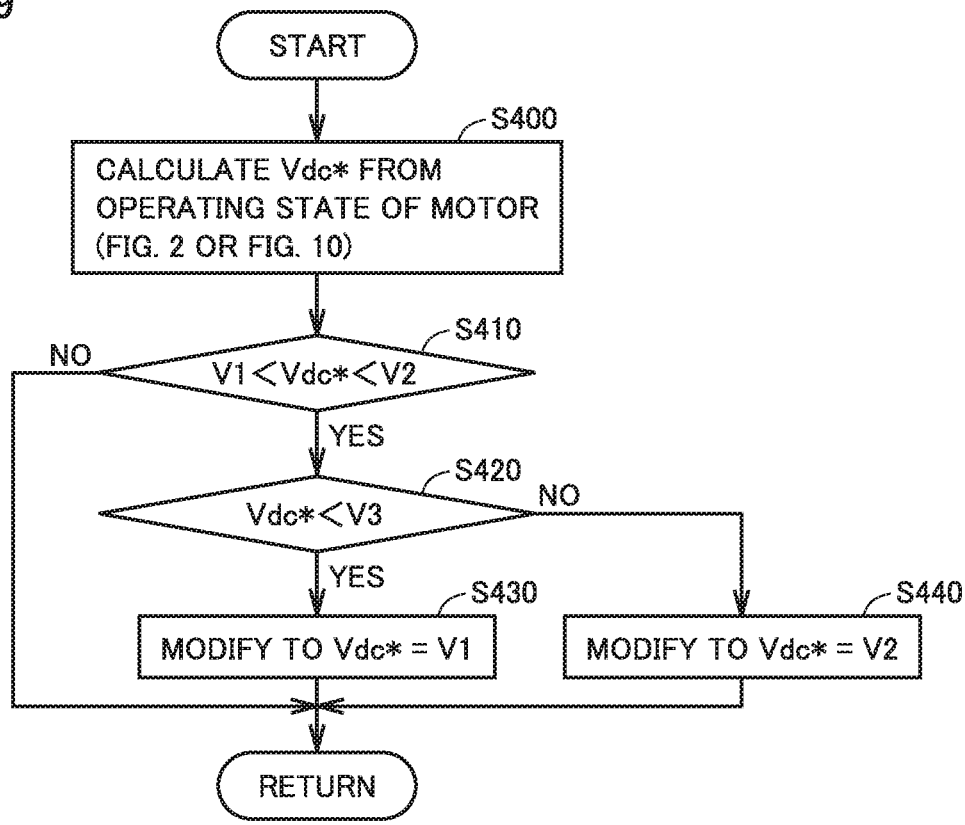
FIG. 19 is a flowchart illustrating a control process for setting a target voltage of a converter according to Embodiment 5.

FIG. 19 is a flowchart illustrating a method of setting a target voltage of an converter according to Embodiment 5.

Referring to FIG. 19, control circuit 90 sets a target voltage Vdc* for converters 40a to 40c to correspond to an operating state of AC motor 200 at step S400. At step S300 also, as with step S200 in FIG. 15 and S300 in FIG. 17, an ideal value of Vdc that is based on the operating state of AC motor 200 can be calculated, according to the description with reference to FIG. 2 or 10.

Control circuit 90, at step S410, determines whether target voltage Vdc* calculated at step S400 is within a range where V1<Vdc*<V2. If target voltage Vdc* is within the range where V1<Vdc*<V2 (YES at S410), use of target voltage Vdc* as is causes a concern that the boost mode and the buck mode may frequently switch.

Thus, control circuit 90, at step S420, confirms whether target voltage Vdc* is within a range where Vdc*<V3. If target voltage Vdc* is Vdc*<V3 (YES at S420), control circuit 90 modifies target voltage Vdc* to Vdc*=V1 at step S430. On the other hand, if target voltage Vdc* is Vdc*≥V3 (NO at S420), control circuit 90 modifies target voltage Vdc* to Vdc*=V2 at step S440.

With this, converters 40a to 40c operate in the buck mode when target voltage Vdc* is within the range where Vdc*<V3, and converters 40a to 40c operate in the boost mode, on the other hand, when target voltage Vdc* is out of that range.

In contrast, if target voltage Vdc* is out of the range where V1<Vdc*<V2 (NO at S410), control circuit 90 skips steps S420 through S440, and maintains target voltage Vdc* set at step S400.

Figure 20:
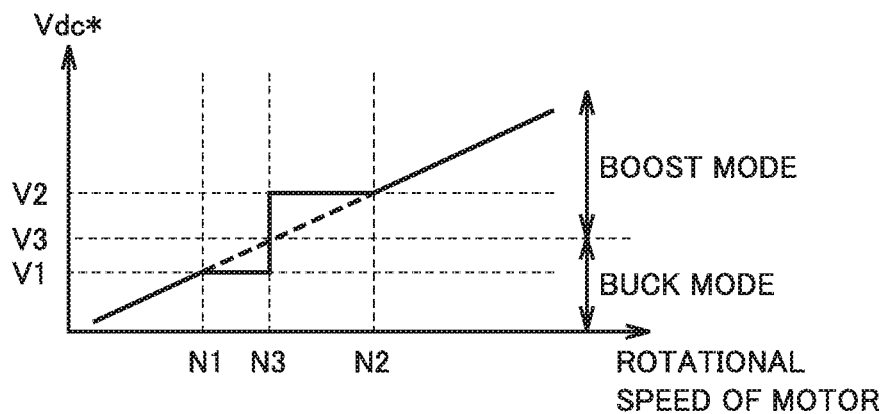
FIG. 20 is a conceptual diagram illustrating the setting of the target voltage of the converter and selection of a mode of operation of the converter, according to Embodiment 5.

FIG. 20 shows an example of setting for target voltage Vdc* of the converter and selection of a mode of operation of the converter, according to Embodiment 5.

Referring to FIG. 20, as target voltage Vdc* is set in proportion to the rotational speed of an AC motor 200, as with FIG. 2, if the rotational speed is in a range higher than N1 and N2 or less, target voltage Vdc* results in being set in the range where V1<Vdc*<V2 at step S400, as indicated by the dotted line.

As indicated by the solid line in FIG. 20, in the processes at steps S410 through S440, if target voltage Vdc* is within the range where V1<Vdc*<V2, Vdc* is compared with a predetermined boundary value V3 and modified to Vdc*=V1 or Vdc*=V2. Accordingly, if the rotational speed is in the range from N1 to N2, converters 40a to 40c can stably operate, avoiding frequent switching between the boost mode and the buck mode.

Here, boundary value V3 is set to a value in a range where V1<V3<V2. The value set for boundary value V3 can determine a boundary between the buck mode and the boost mode. Boundary value V3 can be set based on a total loss of power conversion device 100a or 100b and AC motor 200. For example, if target voltage Vdc* is in the range where V1<Vdc*<V2, a total loss (first total loss) of power conversion device 100a, 100b (boost circuit 30 and inverter 60) and AC motor 200 when converters 40a to 40c are fixedly operated in the boost mode as in Embodiment 3 and a total loss (second total loss) of power conversion device 100a, 100b (buck circuit 20 and inverter 60) and AC motor 200 when converters 40a to 40c is fixedly operated in the buck mode as in Embodiment 3 are obtained for each Vdc* by simulation or the like. Then, V3 can be set to a value where the first total loss when converters 40a to 40c are fixedly operated in the boost mode and the second total loss when converters 40a to 40c are fixedly operated at the buck mode are equal.

This allows, when target voltage Vdc* is in the range where Vdc*<V3, boundary value V3 to be set so that the total loss (the second total loss) when power conversion device 100a, 100b is operated in the buck mode is smaller than the total loss (the first total loss) when power conversion device 100a, 100b is operated in the boost mode. Similarly, when target voltage Vdc* is in the range where Vdc*>V3, boundary value V3 can be set so that the total loss (the first total loss) when power conversion device 100a, 100b is operated in the boost mode is smaller than the total loss (the second total loss) when power conversion device 100a, 100b is operated in the buck mode. As a result, the buck mode is applied when target voltage Vdc* is in the range where Vdc*<V3 and the boost mode is applied when target voltage Vdc* is in the range where Vdc*≥V3, thereby reducing the losses by power conversion device 100a, 100b and AC motor 200.

As such, according to the power conversion device of Embodiment 5, as with the power conversion device according to Embodiments 3 and 4, even when the input voltage has a ripple component, the power conversion device can stably operate and also highly efficiently operate in a manner of minimizing the losses of power conversion device 100a, 100b and AC motor 200.

While Embodiments 1 and 2 and the variations thereof have been described with reference to connecting buck circuit 20 and boost circuit 30 (70) in the stated order in a direction from DC power supply 10 to inverter 60, it should be noted that boost circuit 30 (70) and buck circuit 20 may be connected in the stated order. Even in such a configuration, the ability of highly efficiently driving the AC motor according to an operating state of AC motor 200 can be achieved in both the heavy load range and the light load range by disposing bypass switches 25 and 35 to correspond to buck circuit 20 and boost circuit 30 (70), respectively. Note that target voltage Vdc* can be modified in Embodiments 3 to 5 even in such a configuration.

However, in the configuration where the boost circuit and the buck circuit are connected in the stated order, they can no longer be able to share reactor 45, requiring one reactor to be arranged for each of the boost circuit and the buck circuit. Stated differently, by connecting the buck circuit and the boost circuit in the stated order as illustrated in FIG. 1 etc., advantages effects, such as size reduction and cost reduction can further be enjoyed by sharing the reactor 45.

Note that DC power supply 10 can be configured of a DC power storage element, such as a battery or capacitor in Embodiments 1 and 2 and the variations thereof.

The embodiment presently disclosed should be considered in all aspects illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

10 DC power supply; 11 reference voltage wiring; 15 rectifier circuit; 20 buck circuit; 21, 31, 73, 74 switching element; 22, 32, 71, 72 diode; 25, 35 bypass switch; 25a, 25c switching element; 30, 70 boost circuit; 40, 40a, 40b, 40c converter; 45 reactor; 50 smoothing capacitor; 51 voltage sensor; 60 inverter; 75 intermediate capacitor; 90 control circuit; 100a, 100b, 100c power conversion device; 200 AC motor; DT duty ratio; N1, N2 node; Ni input node (converter); No output node (converter); P1 to P4 current path; Tc switching cycle; Ton on-period; Vc control voltage; Vcw carrier wave voltage; Vdc output voltage (converter); Vdc* target voltage (converter).

The invention claimed is:

1. A power conversion device for driving an AC motor, comprising:
an inverter to supply the AC motor with an AC voltage; and
a converter connected between a DC power supply and the inverter, the converter including:
an input node connected to the DC power supply;
an output node connected to a DC side of the inverter;
a buck circuit including a first semiconductor device;
a boost circuit including a second semiconductor device, and
a reactor electrically connected between the buck circuit and the boost circuit,
the buck circuit and the boost circuit being connected in series between the input node and the output node,
the buck circuit being configured to execute, during operation, a first power conversion for stepping down a voltage which is input,
the boost circuit being configured to execute, during operation, a second power conversion for stepping up a voltage which is input,
the power conversion device further comprising:
a first bypass switch connected in parallel with the first semiconductor device;
a second bypass switch connected in parallel with the second semiconductor device; and
a control circuit to control the boost circuit, the buck circuit, the first bypass switch, and the second bypass switch, wherein the second bypass switch is connected to an intermediate node and the output node in parallel with first and second diodes which are connected in series, wherein a first DC voltage is input to the input node and a second DC voltage is output from the output node, in a first mode in which the second DC voltage is controlled to be in a range above the first DC voltage, the control circuit turns on the first bypass switch, and turns off the second bypass switch, and in a second mode in which the second DC voltage is controlled to be below the first DC voltage, the control circuit turns on the second bypass switch, and turns off the first bypass switch, the control circuit sets a target value for the second DC voltage, according to a rotational speed of the AC motor, or, so that a modulation rate or voltage utilization of the inverter, which is calculated from the AC voltage and the second DC voltage, is constant, the DC power supply includes an AC power supply and a rectifier circuit connected between the AC power supply and the input node, and when the target value of the second DC voltage set according to a state of the AC motor is within a voltage range predetermined to correspond to a voltage region where an output voltage of the rectifier circuit includes a ripple component, the control circuit modifies the target value to a voltage above the voltage range, and causes the power conversion device to operate in the first mode in which the second DC voltage is controlled in a range higher than the first DC voltage.

2. The power conversion device according to claim 1, wherein the boost circuit includes:

a first switching element and a second switching element which are connected in series between a ground wire and the intermediate node;

the first diode and the second diode which are connected in series, as the second semiconductor device, between the intermediate node and the output node; and an intermediate capacitor connected between a point of connection between the first switching element and the second switching element and a point of connection between the first diode and the second diode, wherein the reactor is electrically connected between the intermediate node and the first semiconductor device included in the buck circuit.

3. The power conversion device according to claim 1, wherein the control circuit controls on and off of the first bypass switch and the second bypass switch according to the rotational speed of the AC motor.

4. The power conversion device according to claim 1, wherein the control circuit controls on and off of the first bypass switch and the second bypass switch according to a detection value of an operating state of the AC motor.

5. The power conversion device according to claim 1, wherein the first bypass switch has an on-resistance lower than an on-resistance of the first semiconductor device, and the second bypass switch has an on-resistance lower than an on-resistance of the second semiconductor device.

6. The power conversion device according to claim 1, wherein the buck circuit switches a plurality of different current paths including the reactor to perform the first power conversion, and the boost circuit switches the plurality of different current paths including the reactor to perform the second power conversion.

7. The power conversion device according to claim 1, wherein the control circuit stops the first power conversion by the buck circuit, causes the boost circuit to operate in the first mode, and the control circuit stops the second power conversion by the boost circuit, causes the buck circuit to operate in the second.

8. The power conversion device according to claim 1, wherein the first semiconductor device includes a third switching element, and the control circuit turns on the third switching element and the first bypass switch in the first mode.

9. The power conversion device according to claim 1, wherein at least one of the first bypass switch and the second bypass switch is configured of a plurality of switching elements connected in parallel.

10. A power conversion device for driving an AC motor, comprising:

an inverter to supply the AC motor with an AC voltage; and a converter connected between a DC power supply and the inverter, the converter including:

an input node connected to the DC power supply;

an output node connected to a DC side of the inverter;

a buck circuit including a first semiconductor device;

a boost circuit including a second semiconductor device, and a reactor electrically connected between the buck circuit and the boost circuit, the buck circuit and the boost circuit being connected in series between the input node and the output node, the buck circuit being configured to execute, during operation, a first power conversion for stepping down a voltage which is input, the boost circuit being configured to execute, during operation, a second power conversion for stepping up a voltage which is input, the power conversion device further comprising:

a first bypass switch connected in parallel with the first semiconductor device;

a second bypass switch connected in parallel with the second semiconductor device; and a control circuit to control the boost circuit, the buck circuit, the first bypass switch, and the second bypass switch, wherein the second bypass switch is connected to an intermediate node and the output node in parallel with first and second diodes which are connected in series, wherein a first DC voltage is input to the input node and a second DC voltage is output from the output node, in a first mode in which the second DC voltage is controlled to be in a range above the first DC voltage, the control circuit turns on the first bypass switch, and turns off the second bypass switch, in a second mode in which the second DC voltage is controlled to be below the first DC voltage, the control circuit turns on the second bypass switch, and turns off the first bypass switch, the control circuit sets a target value for the second DC voltage, according to a rotational speed of the AC motor, or, so that a modulation rate or voltage utilization of the inverter, which is calculated from the AC voltage and the second DC voltage, is constant, the DC power supply includes an AC power supply and a rectifier circuit connected between the AC power supply and the input node, and when the target value of the second DC voltage set according to a state of the AC motor is within a voltage range predetermined to correspond to a voltage region where an output voltage of the rectifier circuit includes a ripple component, the control circuit modifies the target value to a voltage below the voltage range, causes the power conversion device to operate in the second mode.

11. The power conversion device according to claim 10, wherein
the boost circuit includes:
a first switching element and a second switching element which are connected in series between a ground wire and the intermediate node;
the first diode and the second diode which are connected in series, as the second semiconductor device, between the intermediate node and the output node; and
an intermediate capacitor connected between a point of connection between the first switching element and the second switching element and a point of connection between the first diode and the second diode, wherein
the reactor is electrically connected between the intermediate node and the first semiconductor device included in the buck circuit.

12. The power conversion device according to claim 10, wherein
the control circuit controls on and off of the first bypass switch and the second bypass switch according to the rotational speed of the AC motor.

13. The power conversion device according to claim 10, wherein
the control circuit controls on and off of the first bypass switch and the second bypass switch according to a detection value of an operating state of the AC motor.

14. The power conversion device according to claim 10, wherein
the first bypass switch has an on-resistance lower than an on-resistance of the first semiconductor device, and the second bypass switch has an on-resistance lower than an on-resistance of the second semiconductor device.

15. The power conversion device according to claim 10, wherein
the buck circuit switches a plurality of different current paths including the reactor to perform the first power conversion, and
the boost circuit switches the plurality of different current paths including the reactor to perform the second power conversion.

16. The power conversion device according to claim 10, wherein
the control circuit stops the first power conversion by the buck circuit, causes the boost circuit to operate in the first mode, and
the control circuit stops the second power conversion by the boost circuit, causes the buck circuit to operate in the second mode.

17. The power conversion device according to claim 10, wherein
the first semiconductor device includes a third switching element, and
the control circuit turns on the third switching element and the first bypass switch in the first mode.

18. A power conversion device for driving an AC motor, comprising:
an inverter to supply the AC motor with an AC voltage; and
a converter connected between a DC power supply and the inverter, the converter including:
an input node connected to the DC power supply;
an output node connected to a DC side of the inverter;
a buck circuit including a first semiconductor device;
a boost circuit including a second semiconductor device, and
a reactor electrically connected between the buck circuit and the boost circuit,
the buck circuit and the boost circuit being connected in series between the input node and the output node,
the buck circuit being configured to execute, during operation, a first power conversion for stepping down a voltage which is input,
the boost circuit being configured to execute, during operation, a second power conversion for stepping up a voltage which is input,
the power conversion device further comprising:
a first bypass switch connected in parallel with the first semiconductor device;
a second bypass switch connected in parallel with the second semiconductor device; and
a control circuit to control the boost circuit, the buck circuit, the first bypass switch, and the second bypass switch, wherein
the second bypass switch is connected to an intermediate node and the output node in parallel with first and second diodes which are connected in series, wherein
a first DC voltage is input to the input node and a second DC voltage is output from the output node,
in a first mode in which the second DC voltage is controlled to be in a range above the first DC voltage, the control circuit turns on the first bypass switch, and turns off the second bypass switch,
in a second mode in which the second DC voltage is controlled to be below the first DC voltage, the control circuit turns on the second bypass switch, and turns off the first bypass switch,
the control circuit sets a target value for the second DC voltage, according to a rotational speed of the AC motor, or, so that a modulation rate or voltage utilization of the inverter, which is calculated from the AC voltage and the second DC voltage, is constant,
the DC power supply includes an AC power supply and a rectifier circuit connected between the AC power supply and the input node, and
when the target value of the second DC voltage set according to a state of the AC motor is within a voltage range predetermined to correspond to a voltage region where an output voltage of the rectifier circuit includes a ripple component, the control circuit modifies the target value to a voltage below the voltage range and causes the power conversion device to operate in the second mode if the target value is lower than a boundary value predetermined to be within the voltage range, and the control circuit modifies the target value to a voltage above the voltage range and causes the power conversion device to operate in the first mode if the target value is higher than the boundary value.

19. The power conversion device according to claim 18, wherein the boost circuit includes:

a first switching element and a second switching element which are connected in series between a ground wire and the intermediate node;

the first diode and the second diode which are connected in series, as the second semiconductor device, between the intermediate node and the output node; and an intermediate capacitor connected between a point of connection between the first switching element and the second switching element and a point of connection between the first diode and the second diode, wherein the reactor is electrically connected between the intermediate node and the first semiconductor device included in the buck circuit.

20. The power conversion device according to claim 18, wherein the boundary value is pre-set based on comparison between a first total loss and a second total loss, the first total loss being a total loss of the power conversion device and the AC motor when the power conversion device is operated in the first mode, the second total loss being a total loss of the power conversion device and the AC motor when the power conversion device is operated in the second mode.

* * * * *